United States Patent [19]

Gallas

[11] Patent Number: 5,112,883

[45] Date of Patent: May 12, 1992

[54] MEDIUM INCORPORATING MELANIN AS AN ABSORBING PIGMENT AGAINST ELECTROMAGNETIC RADIATION

[75] Inventor: James M. Gallas, San Antonio, Tex.

[73] Assignee: Photoprotective Technologies Incorportaed, San Antonio, Tex.

[21] Appl. No.: 614,062

[22] Filed: Nov. 9, 1990

Related U.S. Application Data

[63] Continuation of Ser. No. 255,905, Oct. 6, 1988, abandoned, which is a continuation-in-part of Ser. No. 105,632, Oct. 5, 1987, abandoned, which is a continuation-in-part of Ser. No. 739,556, May 6, 1985, Pat. No. 4,698,374, which is a continuation-in-part of Ser. No. 618,745, Jun. 8, 1984, abandoned, said Ser. No. 105,632, is a continuation-in-part of Ser. No. 88,029, Aug. 18, 1987, which is a continuation of Ser. No. 837,852, Mar. 6, 1986, abandoned, which is a continuation of Ser. No. 739,756, May 30, 1985, abandoned, which is a continuation of Ser. No. 618,745, Jun. 8, 1984, abandoned.

[51] Int. Cl.$^5$ ............................................. C08L 89/04
[52] U.S. Cl. .................................... 523/106; 359/350; 359/355; 359/359; 8/507; 8/509; 8/512; 8/647; 8/678; 8/673; 252/582; 252/587; 252/588; 424/429; 428/412; 428/441; 527/201; 527/202; 527/203; 526/238.1; 526/259; 526/314; 528/205; 528/206; 528/392
[58] Field of Search ................. 523/1.06; 350/1.1, 1.2, 350/1.7; 8/507, 509, 512, 647, 678, 673; 252/582, 587, 588; 424/429; 428/412, 441; 527/201, 202, 203, 238.1, 259, 314; 528/205, 206, 392

[56] References Cited

U.S. PATENT DOCUMENTS

| | | | |
|---|---|---|---|
| 2,822,339 | 2/1958 | Hagemeyer, Jr. et al. | 526/238.1 |
| 3,322,719 | 5/1967 | Pielstocker | 350/1.1 |
| 3,764,477 | 9/1973 | Lehmann et al. | 527/201 |
| 4,101,269 | 7/1978 | Champenois | 8/647 |
| 4,194,877 | 5/1980 | Peterson | 8/647 |
| 4,404,257 | 9/1983 | Olson | 428/412 |
| 4,419,405 | 12/1983 | Ashby et al. | 428/412 |
| 4,464,525 | 8/1984 | Vance | 528/392 |
| 4,650,605 | 3/1987 | Vance | 252/589 |
| 4,929,250 | 5/1990 | Hung et al. | 8/647 |

FOREIGN PATENT DOCUMENTS 1389087  1/1965  France.
9071149  10/1974  Japan.
1060780  3/1967  United Kingdom.

OTHER PUBLICATIONS

Today–San Antonio.
The Merck Index (10th Edition pp. 266, 827 and 1154).
Hackh's Chemical Dictionary (4th Edition) pp. 413 and 698.
Karrer Organic Chemistry, Elsevier, Publishing Co., pp. 428, 429, 576, 577 and 579 (1950).

Primary Examiner—Joseph L. Schofer
Assistant Examiner—Alex H. Walker
Attorney, Agent, or Firm—A. Triantaphyllis

[57] ABSTRACT

The present invention is directed to a medium incorporating melanin for radiation protection.

31 Claims, 3 Drawing Sheets

MEDIUM INCORPORATING MELANIN AS AN ABSORBING PIGMENT AGAINST ELECTROMAGNETIC RADIATION

RELATED APPLICATIONS

This is a continuation of copending application Ser. No. 07/255,905 filed on Oct. 6, 1988 now abandoned, which is a continuation-in-part application of copending application Ser. No. 07/105,632, filed Oct. 5, 1987, now abandoned, which is a continuation-in-part application of application Ser. No. 06/739,556, filed May 30, 1985, now U.S. Pat. No. 4,698,374, issued Oct. 6, 1987, which in turn is a continuation-in-part application of application Ser. No. 06/618,745, filed Jun. 8, 1984, now abandoned; application Ser. No. 07/105,632 is also a continuation-in-part application of copending application Ser. No. 7/088,029, filed Aug. 18, 1987, which in turn is a continuation of application Ser. No. 6/837,852, filed Mar. 6, 1986, now abandoned, which is in turn a continuation of application Ser. No. 6/739,756, filed May 30, 1985, now abandoned, which in turn is a continuation of application 6/618,745, filed Jun. 8, 1984, now abandoned.

FIELD OF THE INVENTION

This invention relates to the field of melanins and, more particularly, to the use of melanin as a pigment to provide ultra-violet, visible and near infrared absorption. Still more particularly, the invention relates to the use of melanin as a radiation absorbing pigment in opthalmic devices, protective eyewear, windows, packaging material, umbrellas, canopies, and other similar media suitable for providing protection from radiation.

BACKGROUND OF INVENTION

In recent years increasing attention has been given to the importance of protecting the eyes and skin from radiation emitted by artificial and natural light sources. Prolonged exposure of the eyes to reflected solar ultraviolet radiation is believed to result, for example, in the formation of cataracts and general tissue damage in the retina. Furthermore, attention has been given to the importance of protecting packaged material from such radiation to reduce the destabilization, degradation, decay or other undesirable effects on that material that may be caused by the radiation.

A variety of commercial optical filters have evolved to meet the threats posed by these radiation environments. Such optical absorption systems include sunglasses, contact lenses, aircraft and automobile windows, welders glasses and others.

In the case of sunglasses, two general types of materials are currently employed as practical absorbing components. Metallic films deposited onto plastic lens substrates are very effective sunscreens providing broad band attenuation of electromagnetic waves from the ultraviolet into the near infrared region of wavelengths. However two disadvantages are associated with this type of sunglass system. Manufacturing steps beyond the formation of the basic plastic lens are required and secondly, waves incident from the rear and reflected directly into the eye pose a new problem and require further manufacturing modifications.

Dyes and pigments comprise the second general class of optical absorbers. These molecular or polymeric elements are either deposited as thin films or are dispersed into the plastic matrix. U.S. Pat. No. 4,157,892 illustrates a method of coloring water-absorbable plastics. Disadvantages of this type of system are often the inability of the dye or pigment to absorb radiation sufficiently over all the ultraviolet wavelengths and a tendency to photodegrade. Photodegradation is particularly common to organic dyes and pigments.

Prior art does exist for melanin as a sunscreen; however, this prior art is restricted to the use of melanin as an ultraviolet protecting pigment in a cosmetic cream applied to the skin (see Japanese Patent-Kokai-74 71, 149).

The use of melanin, an easily synthesized biopolymer, as a sunglass pigment, offers several advantages over the prior art. These advantages will become evident in the following description.

For the purpose of the present description, melanins are defined and classified as in the book entitled Melanins, by R. A. Nicolaus, published in 1968 by Hermann, 115, Boulevard Saint-Germain, Paris, France (hereinafter "Nicolaus") which work in its entirety is incorporated herein by reference. As defined by Nicolaus, melanins constitute a class of pigments which are widespread in the animal and vegetable kingdoms. Melanins are macromolecules consisting of mixtures of polymers that are highly conjugated in nature. The extensive degree of conjugation produces their unique transmittance spectrum. Melanins are highly irregular, three-dimensional polymers not only in the way monomeric units are linked together but in the nature of the units themselves. A typical melanin structure is shown in Arnaud, R., et al, Photochem Photobiol, Vol 38, page 161-168 (1983), Electron Spin Resonance of Melanin from Hair, Effects of Temperature, pH, and Light Irradiation. While the name melanin in Greek means black, not all melanins as pigments are black but may vary from brown to yellow. Melanins are classified in three groups, namely, eumelanins, phaeomelanins and allomelanins. Eumelanins are derived from the precursor tyrosine shown as compound (1):

(1)

Phaeomelanins are derived from the precursors tyrosine or cysteine shown as compound (2):

(2)

Allomelanins, the meaning of which is other melanins, are formed from nitrogen-free precursors, such as catechol. It is also believed that 1,8-dihydroxynapthalene may produce melanin through enzymatic oxidation. Further information on Melanins is found and incorporated herein by reference on page 827, Monograph No. 5629 in The Merck Index (10th Ed.1983). Melanin is produced in nature by the oxidative polymerization of the precursors. Furthermore, melanin may be synthesized commercially or in the laboratory from precursors through the free radical polymerization of these precursors. This invention is directed to the use of any melanin regardless of its source or method of preparation. Therefore, natural, synthetically prepared or any other melanin may be used in accordance with the present invention as an absorbing pigment. An example of the synthetically produced catechol melanin and DOPA melanin are found in the article by Froncisz, W., Sarna, T., Hyde, James S. Arch. Biochem. Biophys. "Copper (2+) ion Probe of Metal-ion Binding Sites in Melanin Using Electron Paramagnetic Resonance Spectroscopy." I. Synthetic Melanins. (1980, 202(1), 289-303). That article is incorporated herein by reference. The catechol melanin is disclosed in the Froncisz et al. article as being produced as follows:

Catechol Melanin. A solution of 15 g of catechol in 3 L of deionized water was brought to pH 8 with ammonium hydroxide, and then air was bubbled through the stirred solution for four days. The resulting melanin was precipitated by addition of concentrated hydrochloric acid to bring the pH to 2, then washed with dilute HCl and dialyzed against deionized water for several days to remove $H^+$ and $Cl^-$ ions. The concentration of the melanin suspension was estimated by drying an aliquot in vacuum over phosphorus pentoxide and weighing. Oxidized catechol melanin was prepared by adding 10 mL of $10^{-3}$ M potassium ferricyanide to 30 mg of melanin and incubating for 10 minutes. The suspension was then spun down, washed twice with deionized water and suspended in 5 mL of deionized water.

Examples of enzymatically produced melanin are found, among others, in the following articles:

Blois, Zahlan and Maling, *Electron Spin Resonance Studies on Melanin,* Biophys. J. (1964, 4, 471);

Woert, Prasad and Borg, J. Neurochem. (1967, 13, 707);

Chauffee, Windle and Friedman, *Electron Spin Resonance Study of Melanin Treated with Reducing Agents,* Biophys. J. (1975, 15, 563-571);

Binns, Chapman, Robson, Swan and Waggott, *Studies Related to the Chemistry of Melanins. Part VIII. The Pyrrol-carboxylic acids formed by oxidation or Hydrolysis of Melanins Derived from 3,4 - dihydroxyphenethylamine or (±) -3,4 dihydroxyphenylalanine,* J. Chem. Soc.(c) (1970, 1128-1133).

These articles are incorporated herein by reference. A typical enzymatic preparation of melanin is disclosed in the Chauffee et. al. article as follows:

A solution of 30 milligrams of purified mushroom tyrosinase (monophenol monooxygenase) in 100 milliliters of Sorensen's buffer of pH of 7 was added to 150 milligrams of L-Dopa (3,4 -dihydroxy phenylalanine) in 500 milliliters of the same buffer solution or to 500 milliliters of a buffer solution saturated with tyrosine. After reaction for two weeks, the precipitated black pigment was filtered, washed with water, and dried over phosphorus pentoxide.

SUMMARY OF THE INVENTION

The present invention is directed to a medium for radiation protection utilizing melanin as an ultraviolet, visible and near-infrared absorbing pigment. The essential and distinguishing feature of the present invention is the specific use of melanin as the absorbing pigment in optical lenses or filters including sunglasses, protective eyewear, contact lenses, intraocular devices, windows, packaging material, umbrellas, canopies, and other media that are suitable for providing protection from radiation emitted from natural or artificial sources. The melanin may be applied to the surface of the media or may be incorporated into the matrix of the media or may be placed or "sandwiched" between portions of the media.

BRIEF DESCRIPTION OF THE DRAWINGS

For a detailed description of the present invention, reference will now be made to the accompanying drawings wherein.

DETAILED DESCRIPTION OF THE INVENTION

In describing this invention the terms "absorbance", "optical density" or "absorption" are used herein to describe the same property of melanin or melanin hydrophylic contact lenses and, therefore, those terms are the same and are used interchangeably to describe such property. It should be understood that the terms absorbance, optical density or absorption are defined by those skilled in the art as the product of the multiplication of concentration of absorbing material times absorptivity times optical path length. In mathematical terms, this relationship is described and used herein as follows:

Absorbance = Optical Density = Absorption = (concentration of absorbing material) × (absorptivity) × (optical path length)

Figure 4:
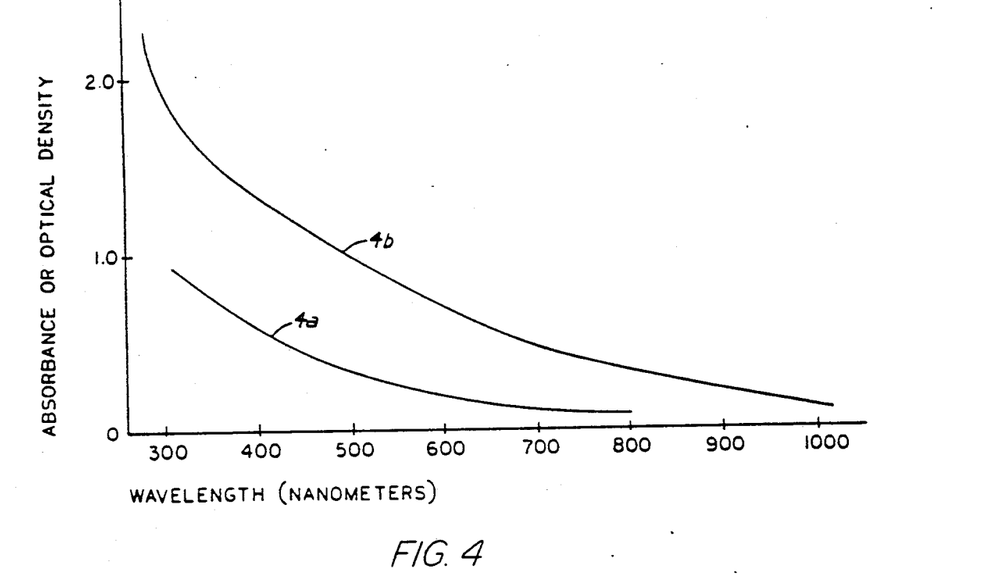
FIG. 4a is a graph showing the absorbance or optical density of a melanin versus the wavelength of the radiation being absorbed.
FIG. 4b is a graph showing the absorbance or optical density of another melanin versus the wavelength of the radiation being absorbed by the melanin.
Figure 5:
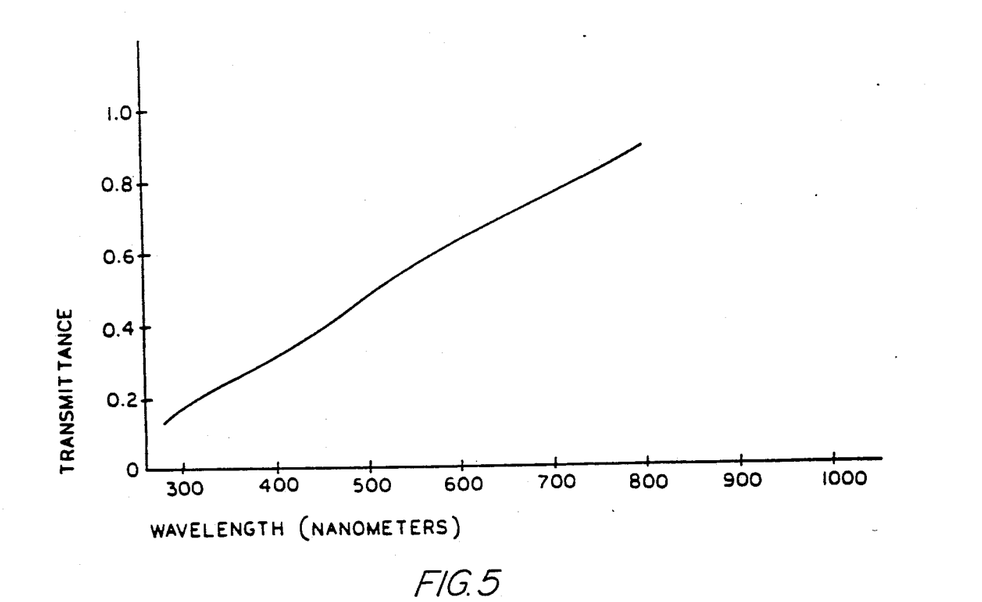
FIG. 5 is a graph that shows the transmittance of the melanin whose absorbance is shown in FIG. 4a versus the wavelength of the radiation.

The terms "transmittance", "relative transmission", or "transmission" are also used to describe the same property of melanin or melanin contact lenses and, therefore, they are used interchangeably to describe such properties. Furthermore the terms "transmittance", "relative transmission", or "transmission" are related to the terms "absorbance", "optical density" or "absorption" by the following mathematical formula:

Transmittance = Relative Transmission = Transmission = 10 - Absorbance = 10 - Optical Density = 10 - Absorption, Referring now to FIG. 4(a) there is shown the absorbance or optical density of L-Dopa aqueous melanin versus the wavelength of the radiation. The concentration of the aqueous melanin is 0.01 milligrams per milliliter. Referring now to FIG. 5 there is shown the transmittance of the aqueous, melanin whose absorbance is shown in FIG. 4(a).

FIG. 4(b) shows the absorbance of 0.1 milligrams of sepiomelanin in a 300 milligram KBr pellet. FIG. 4(b) can be found in Nicolaus. Other graphs showing the absorption or other properties of melanins and a comparison of the absorption or other properties of melanin with those of other substances can be found in that book. Those graphs and the information contained in the Nicolaus Book relating to melanins is incorporated herein by reference.

It is clearly shown in FIGS. 4(a), 4(b), and 5 that the amount of radiation absorbed by the melanin continuously increases as the wavelength of the radiation decreases from the higher wavelengths to the wavelengths wherein the amount of damage is the highest. Because the probability, amount, or severity of retinal damage increases exponentially as the wavelength is decreased from the higher wavelengths toward the ultraviolet region of the spectrum, it is apparent, that the absorption spectrum of melanin is very similar to the action spectrum for the retinal damage or, alternatively, that the percentage of radiation absorbed by melanin increases in the ultraviolet wavelength region wherein the potential of retinal damage increases.

As set forth in more detail in Nicolaus'book, Melanins, the synthetic or natural melanins are the free-radical polymerization products of the melanin precursors. An illustration of the synthetic or natural melanins is the oxidation of tyrosine to DOPA, followed by the free-radical polymerization of DOPA to melanin. The allomelanins may be formed by the free-radical polymerization of a nitrogen-free melanin precursor such as catechol. Whatever the melanin precursor and mode of oxidation and polymerization, the polymerization results in the formation of a highly conjugated polymer, called a melanin, whose exact structure is not known. Because of the number of reactive sites in the melanin precursors and their intermediates, the polymerization of the precursors is heterogeneous and the result is an amorphous, highly irregular, three dimensional polymer whose structure cannot be characterized or defined; see, Straves-Mobelli, and Wyler, *Biological Molecular and Clinical Aspects of Pigmentation: Reinvestigation of the Formation of Dopa Melanin: New Aspects of the Antioxidation of Dopa* (12th International Pigment Cell Conference, 1983, 69-77). Furthermore, the number of melanin precursor units in the polymer is not ascertainable. In order to overcome this difficulty, a given melanin is characterized primarily by its precursor and the spectroscopic properties of the melanin that result from extended conjugation rather than by an exact determination of the structure and chemical formula thereof. Accordingly, a melanin is characterized as follows:

1. a polymer of a monomeric melanin precursor
2. a polymer whose monomeric precursors polymerize via a free-radical or an oxidative mechanism
3. a polymer with a broad band optical absorption spectrum as shown in FIGS. 1a and 1b and FIGS. 4a and 4b
4. a polymer with a stable free-radical which is often studied through ESR spectroscopy
5. a polymer with a highly conjugated Pi electron system
6. an amorphous, three dimensional, heterogeneous polymer of varying molecular weight.

This characterization is adopted to define the melanins in this invention.

In the present invention the preferred melanin precursors are DOPA (compound (3)) and dopamine (compound (4)) which form eumelanins and catechol (compound (5)) which form allomelanin.

(3)

(5)

(4)

Other known melanin precursors which may be used in the present invention are 5,6-dihydroxyindole; leucodopachrome; tryptamine; serotonin (with an enzyme); 5,6-dihydroxyindole-2-carboxylic acid; epinephrine; norepinephrine; tyrosine, adrenochrome; and 1,8-dihydroxynapthalene (with an enzyme).

In the past, synthetic melanins were prepared by using oxygen to initiate the free-radical polymerization of the precursor in a base and water solution. According to the present invention, however, the polymerization reaction may also be initiated in solvents other than water using a free-radical initiator. The free-radical initiator is chosen by considering its solubility properties and the desired reaction kinetics. The most preferred free-radical initiator is benzoyl peroxide. Other preferred free-radical initiators are di-tert-butyl peroxide and di(1-cyano-1-methyl ethyl) diazene (azobisisobutyronitrile). Still other initiator systems include other peroxides, azo compounds, redox pairs, photochemical systems, perborates, percarbonates and radiation. The solvents that may be used, other than water, are organic solvents, such as dimethyl sulfoxide (DMSO), chloroform, toluene, acetonitrile, methylene chloride, 1,2-dichloroethane, alcohols, glycol, etc.

The melanins of the present invention are pigments which are all the polymerization reaction products of the melanin precursors used, which as polymerization reaction products are amorphous, highly irregular polymers. These polymers may have a number of varying structures according to the present invention; however, the polymer or mixture thereof is characterized as being highly conjugated and having the broadband optical absorption spectrum as shown in FIGS. 1a and 1b and FIGS. 4a and 4b which results from extended conjugation and free radicals. Other graphs showing the optical absorption of melanin and a comparison of its optical absorption with that of other substances can be found in the aforementioned Melanin book by Nicolaus. From those graphs, it is apparent that melanin absorbs radiation having wavelengths as high as 2500 nanometers and as low as approximately 200 nanometers. Those graphs and the related information contained in that book are incorporated herein by reference. The aforementioned figures and graphs show that the amount of radiation transmitted through the melanin continuously decreases as the wavelength of the radiation decreases from higher to lower wavelengths or, alternatively, that the amount of radiation absorbed by the melanin continuously increases as the wavelength of the radiation decreases from higher to lower wavelengths. This characteristic of the melanins as utilized in the present invention is very important in that the absorption characteristics are very similar to the action spectrum for retinal damage. In fact, an essential feature of the present invention is that the absorption spectrum associated with melanin is very similar to the action spectrum for retinal damage. More particularly, it is known that although the cornea and lens absorb most of the ultraviolet rays from the sun, a substantial portion of the radiation in the range of wavelengths between 400 nm and 550 nm reaches the retina and cause photochemical damage. The amount and severity of the damage increases exponentially as the wavelength of the radiation decreases towards 400 nanometers. The correlation between retinal damage and wavelength is defined herein as the action spectrum for retinal damage. Therefore, it is apparent that the absorption spectrum of melanin is very similar to the action spectrum for retinal damage or, alternatively, that the percentage of radiation absorbed by melanin increases in the wavelength regions wherein the potential of retinal damage increases.

Relatively few of the sunglass manufacturers have managed to produce lenses which filter out ultraviolet radiation and, of those, most all cut out the ultraviolet wavelengths abruptly, while allowing radiation between the wavelengths of 400 and 550 nanometers to go through and adversely affect the eye. Therefore an optical lens comprising melanin which is placed in front of or inside the eye would not only filter out radiation damaging to the retina, but it would also filter out the wavelengths in the proper proportions. Furthermore, any melanin containing lens placed in front of the eye would also offer radiation protection to the cornea and the lens thereof.

It is apparent that the aforementioned advantages of utilizing melanin are not limited to opthalmic lens systems only and that melanin may be utilized in connection with any media that are suitable for preparing apparatus devices or substances for providing protection from radiation. Accordingly, melanin may be utilized in connection with any lens systems or similar devices such as opthalmic devices including plastic or glass sunglasses, protective eyewear such as welders or skiers masks or goggles, and hard (hydrophobic) or soft (hydrophilic) contact or intraocular lenses; glass or plastic windows such as automobile, building or airplane windows; glass or plastic packaging material such as beverage and food containers; thin plastic sheets; umbrellas; canopies; and other similar devices or substances suitable for the protection of humans or radiation-sensitive substances from radiation. With respect to opthalmic lenses it should be understood that those lenses may be prepared with or without optical prescriptions to correct visual defects.

In the case of hard or hydrophobic lenses the melanin that is incorporated into the lens or on the interior surface of the lens, as hereinafter described, may be used as a superoxide dismutase. More particularly, it is believed by certain authorities in the field, that photochemical damage to the cornea is promoted by oxygen that is present in the cornea or in its vicinity. That oxygen dependence has been disclosed by Zuchlich, Photochem. Photobiol., Volume 25, pages 133-135 (1977). Furthermore, it is believed that when biological molecules are exposed to short wavelength ultra-violet and blue radiation, reactions may occur with oxygen to produce superoxide. Superoxide is also formed by the reaction of oxygen with free melanin radicals that are produced when melanin absorbs light. The term superoxide as used herein is defined as the radical anion of molecular oxygen and is symbolized as $O_2^-$.

It is believed that superoxide is extremely reactive and harmful to biological tissue. Melanin has the ability to react with the superoxide, thereby preventing it from damaging the cornea and/or the lens of the eye. Melanin acts as a superoxide dismutase, i.e., a chemical agent that renders the superoxide harmless through chemical reaction. The melanin is particularly suited as a superoxide dismutase, not only because of its chemical structure, but also, because of the chemical properties of the superoxide. More particularly, superoxide can function either as a chemical oxidant or as a reductant. Because melanin is a redox polymer it may function in a similar fashion. Accordingly, superoxide is reduced by melanin through one reaction and is oxidized by melanin through another reaction. The reduction by melanin reaction is:

The oxidation by melanin reaction is:

Because the hydrogen peroxide being produced by the reduction of superoxide by melanin tends to bleach the melanin and to oxidize the cornea, it is preferred that an agent be present to decompose the hydrogen peroxide to oxygen and water. Such an agent is copper in the form of ions ($CU^{++}$) bound to the melanin polymer as ligands or chelates. These ions decompose the hydrogen peroxide to oxygen and water. Accordingly, one may prevent the bleaching of the melanin in the lens by incorporating those ions into the lens and by bathing the lens in a copper sulphate solution to replenish the $CU^{++}$ ions that are being converted to $CU^+$ ions. This solution would also function as a bacteriostat for the lens.

It is also believed that other free radicals such as hydroxyl cause damage to the eye like the superoxides. Similarly, melanin acts as a scavenger or sink of such radicals to prevent them from damaging the eye.

It should be noted that because melanin absorbs ultra violet radiation that produces the superoxides on the eye surface, any melanin containing medium, whether a contact lens, a sunglass or the like, protects the eye from superoxides and their harmful effects discussed above.

It should be understood that the term "solid" or "material in the solid state" as used herein shall mean all material who have structural and mechanical integrity and whose structure remains fixed and shall include glass and plastic solid devices such as opthalmic devices, windows, containers, umbrellas, canopies, etc., flexible plastic films such as wrap, etc. The term "solid" or "material in the solid state" does not include materials that are comprised of particles that are not connected so as to form a continuous, solid, structurally fixed medium having mechanical integrity. An example of material not included in the term "solid" or "material in the solid state" as used herein are creams and other liquid substances.

The present invention is more specifically shown by the following examples:

A first method according to the present invention in which the melanin pigment may be incorporated into a lens or similar medium including, but not limited to, opthalmic devices, windows, packaging material, or any other radiation protection device made out of polymeric material, is to polymerize the melanin precursor simultaneously with a monomer which is polymerized by free-radical polymerization to form the polymer. In this embodiment the melanin pigment is uniformly dispersed within the plastic medium, layer or lens. For ease of incorporating the melanin precursor it is preferred to use a liquid monomer to form the lens or similar medium system and such monomers are diethylene glycol bis(allyl- carbonate), otherwise known as CR-39, a trademark product of PPG, styrene, methylmethacrylate or any other monomer suitable for the preparation of sunglasses, contact lenses, intraocular lenses, windows, packaging material or any other radiation protection devices such as umbrellas, canopies, etc.

In the case of a lens system, the liquid monomers polymerize by free radical polymerization and yield a polymer which is a clear, transparent plastic suitable for an optical lens when polymerized in the absence of other materials or in other words in the presence of the monomer per se. The melanin is dispersed in the lens system in a non-aggregated form. Although the lens may be used primarily for opthalmic devices, it may also be used in connection with windows, certain packaging material and other similar devices.

In the simultaneous polymerization of both the liquid monomer and the melanin precursors of the present invention, one method is to add the melanin precursor to the liquid monomer while providing good mixing. To this mixture is added the free-radical initiator. The mixture is maintained at a temperature between 50° and 60° C. until the solid polymers are formed. In general, the greater the concentration of melanin precursor the greater the concentration of free-radical initiator is required for the simultaneous polymerization. Using 10 ml of CR-39 and 55° to 60° C. as a standard, applicant has found that, if the ratio of free-radical initiator to melanin precursor is maintained at about 10:1 by weight that simultaneous polymerization occurs.

EXAMPLE 1

Figure 1:
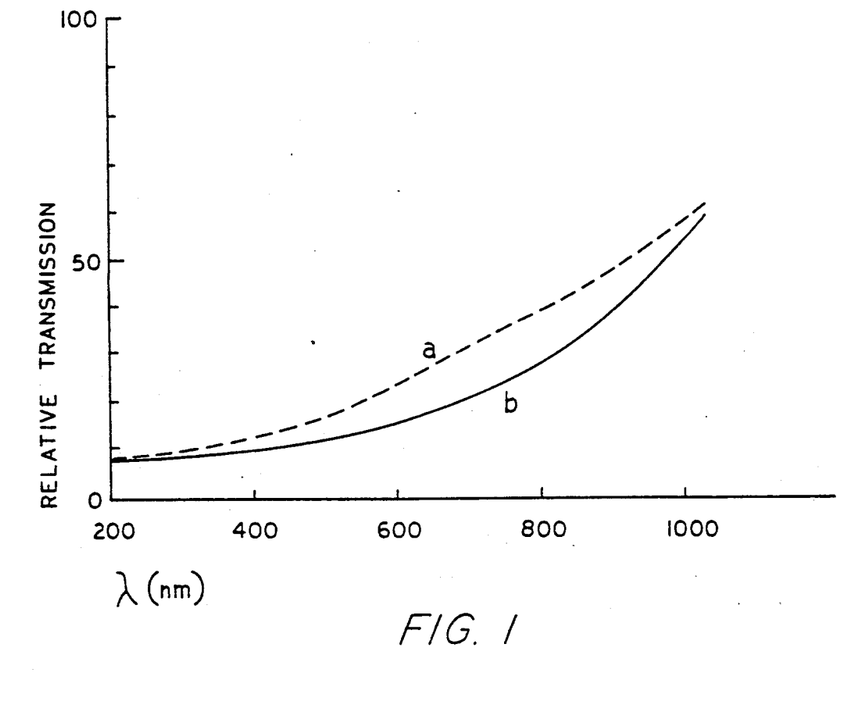
FIG. 1a is a graph that shows the transmittance of a plastic lens containing melanin versus the wavelength (λ) in Example 1 below.
FIG. 1b is a graph that shows the transmittance of a melanin coating described further in Example 2 below.

A melanin-plastic using the melanin precursor catechol may be prepared as follows: Dissolve 400 mg of benzoyl peroxide into 10 ml of diethylene glycol bis(allyl carbonate) ("CR-39") at 50 degrees celsius, stirring continuously until the benzoyl peroxide is fully dissolved. Then add 30 mg of catechol and heat for one day; heat an additional two days at 65 degrees celsius, keeping the sample under a nitrogen atmosphere during the heating. The result is a clear and transparent solid lens with an amber color having melanin in a non-aggregated form uniformly incorporated therein. The solid is then cured in a vacuum oven at 110 degrees celsius for two hours. The relative transmission for the amber colored solid, of thickness 40 mm. is shown in FIG. 1a. This transmission spectrum illustrates the essential feature of melanin incorporated into an optical lens system for the purpose of radiation protection: that is, a uniform reduction in transmittance across the ultraviolet, visible and near infrared wavelengths, with greatest reduction in transmission occurring at the shorter wavelengths where the radiation is most damaging to biological molecules and tissue. An additional feature of this product is its photostability. Samples prepared as described in Example 1 were placed in direct sunlight and open to the atmosphere continuously for a period of 10 weeks during which the daily average solar intensity peaked midday at approximately 850 watts per square meter. There is no discernible discoloration. This feature is quite uncommon for the case of organic pigments. Finally an important advantage of this pigment lens system is that it requires negligibly more effort than the manufacture of the lens without the pigment.

EXAMPLE 2

35 mg of dopamine and 40 micro-liters of triethylamine is added to 10 ml of diethylene glycol bis(allyl carbonate) "CR-39" at 55 degrees centigrade and stirred for approximately one hour (this represents a saturated solution); 350 mg of benzoyl peroxide is then dissolved and the system is heated at 65 degrees for approximately 30 hours until a solid amber colored plastic is formed. The product is then cured at approximately 100 degrees for one hour in a vacuum oven. The optical absorption spectrum is similar to that of melanin (formed in the standard manner).

Figure 2:
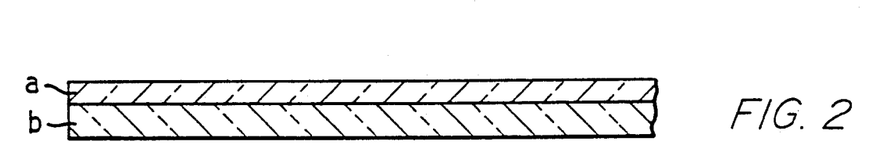
FIG. 2 is a drawing illustrating a transparent plastic or glass medium or lens substrate labeled "b" and a coating of melanin labeled "a" which covers said substrate "b"

In another method of the present invention, the melanin is applied to the surface of the lens or similar medium including, but not limited to, a sunglass, a contact lens, an intraocular device, a protective eyewear, a window, a packaging material or any other polymeric plastic or glass protective device, as a coating. This configuration is illustrated in FIG. 2. The layer labeled "a" is meant to be the melanin coating and the layer labeled "b" is meant to be the lens or similar medium substrate. The configuration may be achieved by first preparing a melanin solution as described earlier. In the case of a small lens, drops of the melanin are then placed onto a clean transparent lens surface and the solvent is then allowed to evaporate, leaving behind a uniform melanin film. Similar techniques may be used to place the melanin on other lenses or similar media.

The melanin is prepared by any of the usual methods for melanin preparation. In these methods the typical solvent is water, however, it has been found that organic solvents such as dimethyl sulfoxide (DMSO), chloroform, acetonitrile, toluene and 1,2-dichloroethane may also be used.

EXAMPLE 3

A melanin coated-glass lens system using the melanin precursor DOPA is prepared as follows: 1 gram of DOPA is dissolved into 200 ml of water. 50 ml of potassium phosphate (0.025M) and sodium phosphate (0.025M) buffer solution is then added and the pH is then adjusted to 7.5. Air is then bubbled into the stirred solution for three days. The black suspension is then extensively dialyzed and the concentration of the melanin is increased by allowing the water to evaporate by a factor of 0.1 of the original volume. A glass lens substrate is then made hydrophilic by treating it with a hot solution of chromic acid, followed by a rinse with deionized water. Several drops of the concentrated melanin suspension are then allowed to spread over the glass surface. The system is allowed to slowly dry, leaving a solid, clear and transparent melanin film wherein the melanin is in a non-aggregated form. The optical density of this film is shown in FIG. 1b and is similar to that of FIG. 1a.

Another method for preparing lenses or other media coated with melanin with a tinted, scratch-resistant coating entails, first, preparing melanin that can be dissolved in an alcoholic solvent such as methanol or isobutanol and mixing the soluble melanin with materials that are commonly used for coating the surface of glass or plastic for improving their scratch resistance or for incorporating UV dyes or tints. The ability to produce a soluble melanin is critical to the procedure. Once the melanin-containing coating material is applied to the surface, it can be thermally or UV cured to produce a hard mar-resistant finish. The darkness of the film can be controlled by the amount of melanin added to the coating solution.

EXAMPLE 4

Catechol melanin was synthesized in acetonitrile as described in Example 6. The resulting melanin was concentrated by evaporation and was redissolved in methanol yielding a homogeneous 2.7% solution. Equal volumes of the methanolic melanin solution and a silicone coating agent (EXXENE S-28) were mixed and applied to a CR-39 blank lens by dipping. The lens was allowed to dry in air for ten (10) minutes. The silicone coating was cured at 120° C. for one (1) hour. The resultant lens had a hard, mar-resistant coating with a light amber tint.

Figure 3:
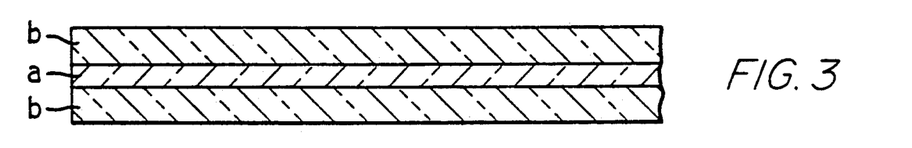
FIG. 3 is a drawing illustrating a coating or film of melanin "a" sandwiched between transparent plastic or glass media or lens substrates labeled "b"

In another embodiment a melanin film is formed by first dissolving a melanin precursor in an organic solvent or in water; a free-radical initiator is then added and heat is added to synthesize the melanin. This intermediate product is a melanin solution or suspension. The suspension is then mixed with a transparent polymer or plastic which serves as a binder or as a binder/adhesive. The solvent is then evaporated having served as means of dispersing melanin in the binder/adhesive. A suitable binder/adhesive is the common epoxy resin and a melanin may be dispersed in the epoxy resin as described. Thereafter, the hardener is then combined with the epoxy/melanin liquid to form a uniform liquid mixture which is then immediately sandwiched between two parallel transparent lenses, or similar media, thereby forming a melanin/epoxy resin mixture as illustrated in FIG. 3. By this method a melanin film is produced which also acts as an adhesive to join the parallel lenses or media portions. This method of incorporating melanin into a medium may be used to form melanin containing opthalmic devices, windows, packaging devices or other similar radiation protection devices.

EXAMPLE 5

500 mg of dopamine and 0.12 ml of triethylamine is added to 10 ml of chloroform to form a saturated solution; approximately 250 milligrams of benzoyl peroxide is added to the system; the system is then allowed to react at room temperature for 24 hours to form a concentrated melanin solution. The solution is then filtered and mixed with about 2 ml epoxy resin. The chloroform is then removed from the product by evaporation leaving melanin dispersed in epoxy resin. Epoxy catalyst, or hardener is added and the system is slowly stirred to produce an even color and drops of the product are deposited onto either glass or plastic lenses; an identical glass or plastic lens is placed over the melanin colored epoxy drops. In this way the epoxy serves to bind the melanin and adhere together the plastic or glass lenses.

In another method, melanin is prepared by dissolving a melanin precursor and a free radical initiator in an organic solvent such as acetonitrile. By using relatively large concentrations of initiator one may form small molecular weight melanin. This is essential in preventing the aggregation of the melanin when it is necessary to form a concentrated mixture of melanin for dispersion in the adhesive. The melanin product is mixed with commercially available UV glue such as "Loctite." The mixture is then placed between two opthalmic lenses, two window sheets, portions of similar media, etc. The sandwiched product is placed in the path of a UV light to cure the adhesive and lock it in place.

EXAMPLE 6

12 grams of catechol and four grams of benzoyl peroxide were dissolved into 100 Milliliters of acetonitrile. The solution was heated in an apparatus with a condenser at 60° C. for 24 hours. After 24 hours, the solution was cooled and then filtered. Following the filtered solution was concentrated by allowing approximately two-thirds of the solvent to evaporate and the concentrated solution was filtered with 0.2 micron millipore filters. The resultant product was then mixed with a commercially available UV curing glue which is known as "Loctite 350." The resultant mixture was a melanin containing glue. The mixture was then placed between two identical lenses. The lenses were pressed against each other. The resultant lens was then placed in the path of a UV light beam which cured the adhesive and locked in place the melanin between the lenses.

EXAMPLE 7

Figure 6:
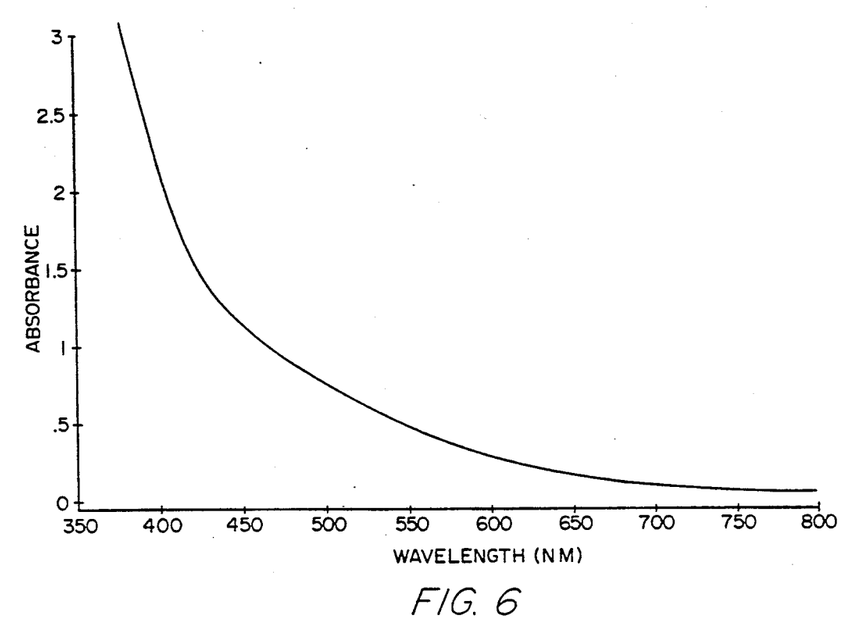
FIG. 6 is a graph that shows the absorbance or optical density of a melanin containing medium prepared in accordance with Example 7 versus the wavelength of the radiation in nanometers (nm)
Figure 7:
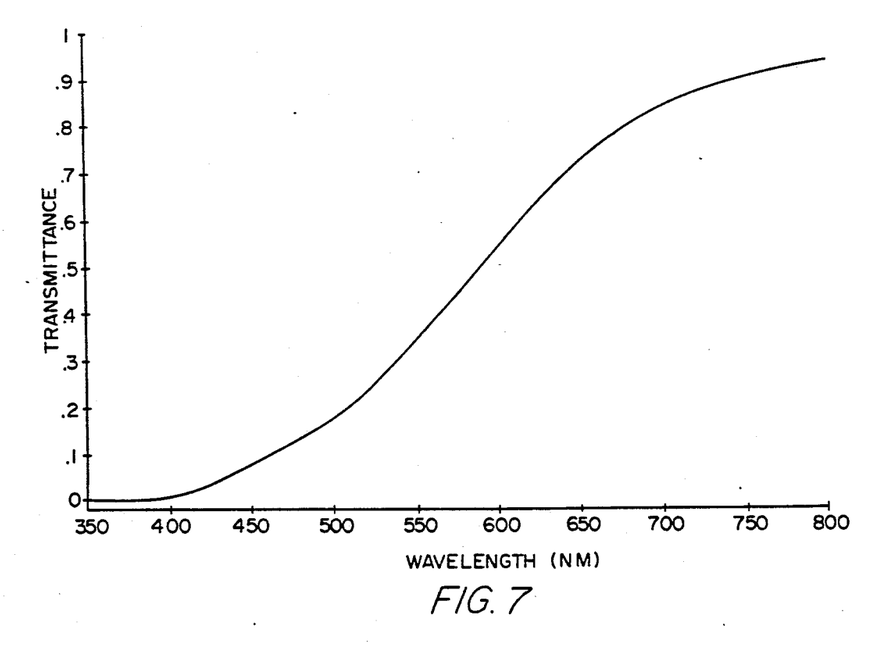
FIG. 7 is a graph that shows the transmittance of the melanin containing medium whose absorbance is shown in FIG. 6 versus the wavelength of the radiation in nanometers (nm).

Five (5) grams of catechol, seven (7) grams of benzoyl peroxide, and two (2) milliliters of triethylamine were dissolved into 200 milliliters of acetonitrile. The solution was heated in an apparatus with a condenser at 75° C. for 24 hours. After 24 hours, the solution was cooled and then filtered. Following, the filtered solution was concentrated by allowing approximately two-thirds of the solvent to evaporate and the concentrated solution was filtered with 0.2 micron millipore filters. The concentrated solution was refrigerated and impurities contained therein were precipitated. Then the solution was filtered with 0.2 micron millipore filters and was concentrated by allowing the remaining solvent to evaporate. The resultant product was then mixed with a commercially available UV curing glue which is known as "Loctite FMD 89." The resultant mixture was a melanin containing glue. The mixture was then placed between two identical lenses. The lenses were pressed against each other. The resultant lens was then placed in the path of a UV light beam which cured the adhesive and locked in place the melanin between the lenses. The absorbance of the lens is shown in FIG. 6 and its transmittance is shown in FIG. 7.

EXAMPLE 8

2.6 grams of benzoyl peroxide were dissolved into 150 ml of acetonitrile. The solution was heated to 65° C. Then, 6.0 grams of catechol monomer was dissolved in the solution. Then, 1.5 ml of triethylamine was added to the solution and the solution was continuously heated at 65° C. for 16 hours. At the end of that period, the solution was cooled and then filtered with a 0.4 micron filter paper. The filtered contents, which was a low molecular weight melanin solution were poured into open dishes and the acetonitrite was allowed to evaporate. After approximately two days, most of the acetonitrile evaporated and the remaining product in the dishes was a thick, black, non-aggregated concentrated low molecular weight melanin solution.

One (1) part of the non-aggregated melanin solution was added to approximately three (3) to four (4) parts (by volume) of "Loctite 350" ultra-violet or UV curing adhesive. The mixture was mixed slowly and thoroughly and the bubbles formed were allowed to diffuse outward for one (1) day. A small amount of the resultant melanin adhesive mixture was placed between identical glass lenses. UV light of 350 nm was applied to the lenses until the lenses bonded. The lenses were then heat treated in an oven at about 140° C. for approximately 6 to 8 hours.

Another method for preparing a melanin containing medium and for incorporating the melanin into a medium suitable for providing protection from radiation entails the preparation of a very thin film or sheet of plastic containing melanin. The film may be affixed to the surface of a lens, a window or similar apparatus by using an adhesive. Furthermore, the film may be placed or laminated between two lenses, window sheets or similar devices by using an adhesive. Furthermore, the melanin-containing sheet or film may be placed between two glass lenses or similar media under heat and pressure (autoclaving), whereby the melanin sheet may act as a binder. Furthermore, the film may be used alone as a radiation protection device in packaging or similar applications. Melanin-containing thin sheets may be prepared by two general methods.

One method for preparing thin plastic sheets incorporating melanin entails first, preparing melanin in a solvent which is capable of dissolving the plastic material to be used for the production of the film followed by dissolving the plastic material in the solution. The solution is then poured into a flat, chemically inert surface and heated. The solvent is allowed to evaporate and the resultant product is a thin transparent plastic sheet or film containing melanin.

Another method for preparing thin melanin-containing plastic sheets entails the synthesis of a low molecular weight melanin in a solvent, which does not dissolve the plastic to be used as a transparent optical sheet, window or radiation absorbing device, such as acetonitrile. The plastic sheet, such as a polyvinyl chloride plastic sheet, is bathed into the melanin-acetonitrile solution under heat and pressure. The small particle melanin diffuses into the pores of the plastic and becomes entrapped. After a period of time the sheet is removed and the resultant product is a plastic clear and transparent sheet having melanin incorporated therein. The darkness of the sheet can be varied by varying the concentration of the melanin in the solution. Furthermore, the rate of diffusion of the melanin particles can be increased by increasing the temperature.

EXAMPLE 9

Three (3) grams of benzoyl peroxide and ten (10) grams of dopamine were added to fifty (50) milliliters of chloroform and heated to 55° C. for 24 hours with an apparatus having a condenser. The product was then filtered with 0.2 micron millipore filters. Then, three (3) grams of polymethymethacrylate were dissolved in the filtered solution and the resultant transparent solution was poured onto a flat "Teflon" coated plate. The solvent was allowed to slowly evaporate. The resultant product was a thin transparent plastic sheet similar to material being marketed under the trademark "Saran Wrap" in appearance and having a brown to amber color. The sheet was then placed between two identical optical lenses and glued thereto with an adhesive to form a lens.

EXAMPLE 10

2.6 grams of benzoyl peroxide was dissolved into 150 grams of acetonitrile and the solution was stirred. 0.6 grams of catechol was then added to the solution followed by the addition of 1 milliliter of triethylamine. The solution was heated to 60° C. and stirred for 24 hours. The final product was filtered to produce a dark melanin-acetonitrile solution with the melanin having a low molecular weight. Thin sheets of polyvinyl chloride having a thickness of less than one (1) millimeter were bathed in the above solution for 24 hours at room temperature and were then removed. The result was an optically clear, transparent, melanin colored thin sheet of polyvinyl chloride.

Because of the free radical nature of the melanin polymer, melanin acts as a radical trap and may slow down or sometimes completely inhibit the polymerization. According to the present invention, soluble or derivatized melanin is prepared and utilized that allows rapid and effective polymerization of melanin-containing monomers.

Another method for the preparation of a lens entails first mixing preformed melanin with a monomer and polymerizing the monomer containing the melanin to form a copolymer containing the melanin. Prior to polymerizing the monomer, it is preferred that the melanin be coated or sequestered by the monomer to prevent the melanin from interfering with the polymerization of the monomer. This coating or sequestration is achieved by utilizing appropriate coupling agents that activate and promote it or by using appropriate flushing agents. In a typical application, previously formed melanin in a solvent such as acetonitrile, is mixed with a monomer such as diethylene glycol (bis) allyl carbonate ("CR-39"). Then, a coupling agent such as dicylcohexyl carbodiimide or other carboxyl activating reagent such as carbodiimides is added to activate the sequestration of melanin by the monomer. The monomer/melanin solution containing the sequestered melanin may be stored at a relatively low temperature such as 4° C. for the preparation of lenses at a later time or it may be heated to form a lens through polymerization. In this method the color of the lens and the degree of radiation protection can be adjusted by adjusting the amount of melanin.

EXAMPLE 11

A solution of 5 grams of acetonitrile and 4 grams of melanin was formed. The solution was then added to 193.4 grams of diethylene glycol (bis) allyl carbonate ("CR-39") monomer in a glass beaker. 4 grams of dicylcohexyl carbodiimide coupling agent was added in 250 milligram quantities. The solution was left undisturbed for approximately 10 to 12 hours. Then, the solution was filtered by vacuum through a fine Buckner filter funnel to remove a precipitate that was formed leaving a dark concentrated liquid product. One part of that product was mixed with three parts of CR-39 liquid monomer. Then, 10 ml of the mixture were mixed with 400 milligrams of benzoyl peroxide. The mixture was then heated at 70° C. for 24 hours to form a melanin-containing lens.

Another method involves dispersing melanin precursor such as catechol or L-dopa or dopamine melanin into a melted liquid plastic.

EXAMPLE 12

This is a theoretical example. 5 milligrams of previously formed melanin from catechol was dispersed in 10 milliliters of liquid melted polycarbonate plastic. The mixture was heated under nitrogen until a homogeneous mixture was formed.

Alternative procedures for sequestering the melanin to make it soluble in various monomers for copolymerization includes using bifunctional agents such as allyl, methallyl, or vinyl chloroformates; methacryl chloride; methacryl oxypropyl dimethyl chloro silane; isocyanatoethyl methacrylate; and other agents containing a free radical polymerizable group as well as a chemical reactive group that can be reacted with carboxyl or phenolic functional groups on the melanin. Furthermore, similar reagents that can not enter into a copolymerization with the monomer plastic can also be used as flushing or solubilizing agents. In the latter case, the melanin will not be covalently incorporated into the ultimate polymer but will only be sequestered and physically trapped in the polymer matrix.

EXAMPLE 13

Aqueous L-Dopa melanin (4.0 milliliters) having a concentration of 1 milligram per milliliter was reacted, in the presence of excess triethylamine (1.0 milliliter), with methacryloyl chloride (1.0 milliliter) by dropwise addition until no further precipitate was formed. The solution was extracted with tetrahydrofuran (THF) and the melanin soluble organic phase was dried over magnesium sulfate and filtered by vacuum. The derivatized melanin/THF solution was concentrated by evaporation. Concentration by evaporation, however, is not required to use this melanin in connection with this invention.

EXAMPLE 14

The procedure of Example 13 was repeated except for the fact that 4.0 milliliters of acetonitrile catechol melanin having a concentration of 1 milligram per milliliter was used instead of aqueous L-Dopa melanin and after addition of the methacryloyl chloride, the solution was filtered to remove the hydrochloride salt of the triethylamine. The derivatized melanin was concentrated by evaporation. Concentration by evaporation, however, is not required to use this melanin in connection with this invention.

EXAMPLE 15

An aliquot of aqueous L-Dopa melanin derivatized with methacryloyl chloride as described in Example 13 was added to a CR-39 monomer solution containing three (3) percent benzoyl peroxide polymerization catalyst. Sufficient amount of such melanin was added to the CR-39 solution to obtain a mixture whose absorbance was 1 at the wavelength of 400 nanometers. The mixture was polymerized by heating it overnight at 65° C. The polymerized mixture was cured at 100° C. to yield a golden brown polymer.

EXAMPLE 16

Al aliquot of acetonitrile catechol melanin derivatized with methacryloyl chloride as described in Example 14 was added to a CR-39 monomer solution containing three (3) percent benzoyl peroxide polymerization catalyst. Sufficient amount of such melanin was added to the CR-39 solution to obtain a mixture whose absorbance was 1 at the wavelength of 400 nanometers. The mixture was polymerized by heating it overnight at 65° C. The polymerized mixture was cured at 100° C. to yield a golden brown polymer.

EXAMPLE 17

Aqueous L-Dopa melanin (1-2 milligrams/milliliter) was reacted with excess trimethyl chlorosilane in the presence of excess triethylamine. The aqueous melanin precipitated upon the reaction and the water was removed. The derivatized melanin is soluble in alcohol (methanol) and it can be solubilized for polymerization in CR-39 or incorporation into a silicone coating or a silicone polymer.

EXAMPLE 18

Catechol melanin (1-2 milligrams/milliliter) was reacted with excess trimethyl chlorosilane in the presence of excess triethylamine. The hydrochloride salt of the base precipitated and the precipitate was removed by filtration. The derivatized melanin is soluble in alcohol (methanol) and it can be solubilized for polymerization in CR-39 or incorporation into a silicone coating or a silicone polymer. The derivatized melanin of this example may be used without requiring concentration by evaporation.

From the foregoing description, the principal advantages of melanin as an absorbing pigment in a media for radiation protection are:

a. melanin is resistant to light, thermal and chemical degradation;

b. melanin provides broad band optical absorption; this covers the entire solar spectrum (See FIGS. 1a, 1b, 4a, 4b, 5, 6, and 7);

c. the melanin absorptivity increases steadily for the shorter (more damaging) wavelengths (See FIGS. 1a, 1b, 4a, 4b, 5, 6, and 7);

d. the increase in the melanin absorptivity for the shorter wavelengths is an optimum for protection of the retina against radiation damage; that is, the shape of the melanin absorption spectrum is similar to the shape of the retina damage spectrum;

e. because of its structure, melanin is able to effectively stabilize and accommodate free-radicals; such free-radicals can be induced by heat or light in molecules nearby the melanin macromolecule and can then transfer to the melanin structure for stabilization; without such an avenue the highly reactive free-radicals would react and lead to chemical degradation; and f. melanin is photochromic; that is light can induce immediate darkening of melanin; this darkening may represent a reversible oxidation of the polymer with free radical intermediates.

g. melanin can be chemically derivatized to provide increased solubility in a variety of monomers and has enhanced capability to be incorporated in a polymer produced by free radical polymerization.

While the invention has been described herein with reference to certain specific materials, procedures and examples, it is understood that the invention is not restricted to the particular materials, combinations of materials and procedures selected for the purpose of illustrations. Numerous variations of such details can be employed by those skilled in the art within the scope of this invention which is defined by the appended claims.

I claim:

1. An apparatus for absorbing ultraviolet, visible and near-infrared radiation emitted from natural or artificial sources, comprising:
   a transparent solid material formed by the polymerization of a monomer;
   melanin; and
   a reagent being chemically attached to the melanin through a covalent bond to make the melanin derivatized melanin so that the melanin is more soluble in the monomer prior to the polymerization of the monomer, the derivatized melanin being connected to the material.

2. An apparatus according to claim 1 wherein the apparatus is an opthalmic device.

3. An apparatus according to claim 2 wherein the apparatus is a sunglass.

4. An apparatus according to claim 2 wherein the apparatus is a hard or hydrophobic contact lens.

5. An apparatus according to claim 2 wherein the apparatus is an intraocular device.

6. An apparatus according to claim 1 wherein the apparatus is a packaging device.

7. An apparatus according to claim 1 wherein the apparatus is a plastic film.

8. An apparatus according to claim 1 wherein the apparatus is a window.

9. An apparatus according to claim 1 wherein the apparatus is an umbrella.

10. An apparatus according to claim 1 wherein the apparatus is a canopy.

11. An apparatus according to claim 1 wherein the melanin is attached to the surface of the solid material.

12. An apparatus according to claim 1 wherein the melanin is incorporated in the solid material.

13. An apparatus for absorbing ultraviolet, visible, and near-infrared radiation emitted from natural or artificial sources, comprising:
   a transparent polymeric solid material being formed by the polymerization of a monomer; and
   a sequestered melanin being connected with the material, the melanin being sequestered by the monomer through a covalent bond between the melanin and the monomer to prevent the interference of the melanin with the polymerization of the monomer.

14. An apparatus according to claim 13 wherein the covalent bond is formed through activation by a coupling agent.

15. An apparatus according to claim 14 wherein the coupling agent is a carboxyl activating reagent.

16. An apparatus according to claim 15 wherein the carboxyl activating agent is a carbodiimide.

17. An apparatus according to claim 1 wherein the reagent contains a free radical polymerizable group which copolymerizes with the monomer.

18. An apparatus according to claim 1 wherein the reagent is a bisfunctional reagent.

19. An apparatus according to claim 1 wherein the reagent does not copolymerize with the monomer and the derivatized melanin is physically trapped in the material.

20. An apparatus according to claim 19 wherein the reagent is trimethyl chlorosilane.

21. An apparatus according to claim 1 wherein, prior to the formation of the covalent bond, the reagent includes a chemical reactive group that can be reacted with carboxyl or phenolic functional groups on the melanin to form the covalent bond.

22. A product prepared by a process comprising the steps of:
   mixing melanin with a monomer;
   sequestering the melanin by forming a covalent bond between the melanin and the monomer; and
   polymerizing the monomer;
   the formation of the covalent bond preventing the interference of melanin with the polymerization of the monomer.

23. A product prepared by a process according to claim 22 wherein the covalent bond is formed through activation by a coupling agent.

24. A product prepared by a process comprising the steps of:
   reacting melanin with a reagent to from derivatized melanin wherein a covalent bond is formed between the reagent and the melanin;
   mixing the derivatized melanin with a monomer; and
   polymerizing the monomer.

25. A product prepared by a process according to claim 24 wherein the reagent includes:
   a chemical reactive group which reacts with the melanin to form the covalent bond; and
   a free radical polymerizable group which copolymerizes with the monomer.

26. An apparatus for absorbing ultraviolet, visible and near-infrared radiation emitted from natural or artificial sources, comprising:
   a transparent solid material formed by the polymerization of a monomer;
   melanin; and
   a reagent which physically traps the melanin to make the melanin sequestered melanin so that the melanin is more soluble in the monomer prior to the polymerization of the monomer, the sequestered melanin being connected to the material.

27. An apparatus according to claim 26 wherein the reagent is a flushing agent.

28. An apparatus according to claim 26 wherein the reagent is a solubilizing agent.

29. A product prepared by a process, comprising the steps of:
   mixing melanin with an agent to physically trap the melanin to physically sequester the melanin;
   combining the physically sequestered melanin with a monomer; and
   polymerizing the monomer.

30. A product prepared by the process according to claim 29 wherein the agent is a flushing agent.

31. A product prepared by the process according to claim 29 wherein the agent is a solubilizing agent.

* * * * *